United States Patent [19]

Murašov

[11] 4,154,984
[45] May 15, 1979

[54] PROCESS AND APPARATUS FOR ACHIEVING FRAME SYNCHRONIZATION IN A PCM RECEIVER OF A PCM T.D.M. TELECOMMUNICATIONS NETWORK

[75] Inventor: Vadim Murašov, Munich, Fed. Rep. of Germany

[73] Assignee: Siemens Aktiengesellschaft, Berlin & Munich, Fed. Rep. of Germany

[21] Appl. No.: 890,590

[22] Filed: Mar. 20, 1978

[30] Foreign Application Priority Data

Apr. 29, 1977 [DE] Fed. Rep. of Germany ....... 2719224

[51] Int. Cl.² .............................................. H04J 3/06
[52] U.S. Cl. ................................................. 179/15 BS
[58] Field of Search ................... 179/15 BS; 178/69.1, 178/50

[56] References Cited

U.S. PATENT DOCUMENTS

| | | | |
|---|---|---|---|
| 3,576,947 | 5/1971 | Kruger | 179/15 BS |
| 3,603,735 | 9/1971 | Cleobury | 179/15 BS |
| 3,764,989 | 10/1973 | McClellan | 178/50 |
| 3,928,726 | 12/1975 | Colton | 179/15 BS |

Primary Examiner—David L. Stewart
Attorney, Agent, or Firm—Hill, Gross, Simpson, Van Santen, Steadman, Chiara & Simpson

[57] ABSTRACT

Frame synchronization is achieved in a pulse code modulation receiver, including a receiving counter, of a pulse code modulation time division multiplex telecommunications network in response to receipt of frame synchronizing signals which occur in each m-th of the pulse frames on which the telecommunications system is based. A hunting process is carried out during a synchronizing time interval following the occurrence of frame synchronizing the signals at intervals of m pulse frames and in response to such occurrence a receiving counter is synchronized. The contents of the time sections in which the frame synchronizing signals can occur are stored for a period of m-1 pulse frames, along with the time section contents of corresponding time sections of preceding and following pulse frames. The stored contents are logically checked m-1 times to determine if the frame synchronizing signals occur only once within m pulse frames in corresponding time sections and, upon a positive result of said checking, a result signal is entered into a circulating memory and circulated over an interval of one pulse frame and renewed and circulated one pulse frame later in response to a corresponding positive result. Upon the absence of a positive result, the result signal is erased from the circulating memory. The receiving counter is reset when, during an interval of one pulse frame, only one entry has been made in the circulating memory. The steps are repeated after setting of the receiving counter beginning with the next first entry into the circulating memory.

3 Claims, 1 Drawing Figure

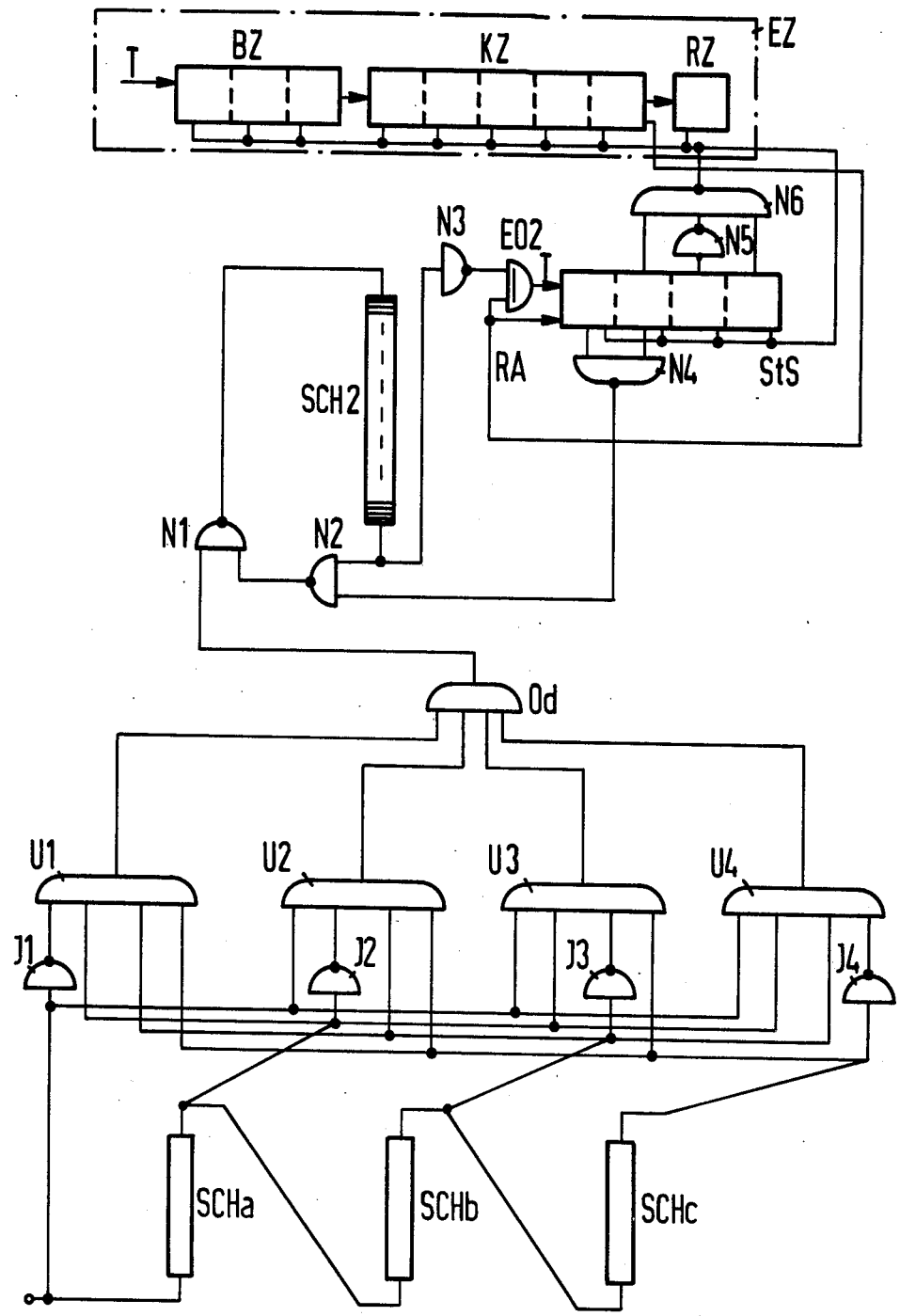

PROCESS AND APPARATUS FOR ACHIEVING FRAME SYNCHRONIZATION IN A PCM RECEIVER OF A PCM T.D.M. TELECOMMUNICATIONS NETWORK

BACKGROUND OF THE INVENTION

1. Field of the Invention

This invention relates to a process and to apparatus for achieving frame synchronization in a pulse code modulation (PCM) receiver of a PCM time division multiplex (T.D.M.) telecommunications network with the aid of frame synchronizing signals which occur in each m-th of the pulse frames on which the telecommunications network is based, in particular in each second pulse frame, wherein a hunting process is carried out during a synchronizing time interval following the occurrence of frame synchronizing signals spaced by m pulse frames, and as a result of this event, the synchronous state of the receiving counter is established. A procedure of this type complies with the CCI recommendations inasmuch as a hunting process for genuine frame code words from which the aforementioned frame synchronizing signals are derived is considered to be terminated when, following the first reception of a frame code word at a time interval of one pulse frame, the frame code word fails to appear and a frame code word is received again at an interval of one further pulse frame.

2. Description of the Prior Art

Circuit arrangements have already been proposed which carry out a process of this type with a relatively low circuit expense. In this connection, one may refer to the German Patent Applications Nos. P 25 43 389.9 and P 25 42 868.6.

In the aforementioned circuit arrangements, the device which is to be synchronized is set the first time a pulse frame code word is established. When, one pulse frame later, a pulse frame code word again occurs or, two pulse frames later, no pulse frame code word is received, a new hunting process is immediately carried out which likewise involves a resetting of the device to be synchronized. In order to avoid that, following the conclusion of a hunting process and the failure of a frame code word to appear at the expected time, the occurrence of each further frame code word will lead to a resetting of the device to be synchronized, in the aforementioned proposed circuit arrangements, the use of time elements ensures that the setting of the device to be synchronized which is carried out following the conclusion of the hunting process is maintained at least over n and preferably 6 pulse frames which satisfies a further requirement of the aforementioned CCI recommendations.

The simulation of a frame code word by speech signals occurs relatively frequently. In most cases, the frame code word is then received over a large number of pulse frames with the result that the hunting process for a correct frame code word lasts for a plurality of pulse frames. In order to avoid this, a process has been proposed in which the contents of the time sections within which frame synchronizing signals can occur is stored for one pulse frame, and is compared with the contents of the section, corresponding time-wise, of the particular following pulse frame, and wherein the first signal to occur during the synchronizing time interval when non-identity has been established, resets the receiving counter into a determinate starting position. This ensures that simulated frame code words of this type which appear over a period of several pulse frames in the same time slot can in no way lead to the setting of the device to be synchronized. Only when, following the reception of a frame code word in the same time slot of the following pulse frame, the frame code word fails to appear is the device to be synchronized set into a determinate starting position. Therefore, incorrect setting of the receiving counter can only be brought about by simulated frame code words which can be recognized at an interval of more than two pulse frames. Here again, however, it is necessary to ensure, by means of additional circuit measures, that, following the establishment of the synchronous state, the existing setting conditions can be changed only when the frame code word has failed to appear several times. However, this also means, of course, that a new hunting process for correct frame code words does not begin until a predetermined time interval of this type, for example 6 pulse frames, has expired.

SUMMARY OF THE INVENTION

Therefore, the object of the present invention is to provide a process and apparatus which produces even more favorable conditions in this respect, and thus leads to the achievement of the synchronous state in the shortest possible length of time, but at the same time retains the advantages of the aforementioned proposed process.

According to the invention, this object is achieved, in a process of the type described above, in that the contents of the time sections within which the frame synchronizing signals can occur is stored for a period of $m-1$ pulse frames, and during the interval of this storage time is used, together with time section contents stored during corresponding time sections of preceding and following pulse frames, and together with the contents of the corresponding time section of the currently occurring pulse frame $m-1$ times, in order to check whether only one frame synchronizing signal is occurring within m consecutive pulse frames in corresponding time sections, that the result signals which indicate a positive check result cause an entry to be made into a collector loop having a cycle time of one pulse frame, that with each result signal which occurs one pulse frame later the corresponding entry in the collector loop is renewed, but in the absence of a result signal is erased, that the receiving counter is not set until, within a time interval of one pulse frame, only one entry in the collector loop has been established, and that when a result signal fails to appear following the setting of the receiving counter, the processes which begin with the first entry into the collector loop are repeated.

A process organized and operated in accordance with the present invention also ensures that simulated frame code words which appear over a period of several pulse frames in the same time slot do not lead to a setting of the receiving counter. Furthermore, in a process for achieving frame synchronization in accordance with the present invention, it is possible to effect a setting of the receiving counter immediately when simulated frame code words which occur in a time interval which is longer than m pulse frames are recognized as faulty, and only one entry, which has arisen on the basis of a genuine frame code word, is contained in the collector loop. Finally, in a process organized and operated in accordance with the present invention, the failure of a frame code word to appear in the synchronous state does not, in fact, lead to the immediate introduction of a hunting process, but that a resetting—if such is necessary—does not take place until a new, genuine frame code word has been discovered. This obviates the need for additional circuits which, in spite of the absence of the frame code word, maintain the set state of the receiving counter over a specific interval of time, and on the other hand avoids the need to wait longer than absolutely necessary, namely longer than the discovery of a genuine frame code word for a resetting operation.

According to the invention, an advantageous circuit arrangement is provided, with the aid of which the process of the invention can be carried out with a particularly low circuit expense, the circuit arrangement being dealt with below in detail so that further discussion at this point is not necessary.

BRIEF DESCRIPTION OF THE DRAWING

Other objects, features and advantages of the invention, its organization, construction and operation will be best understood from the following detailed description, taken in conjunction with the accompanying drawing, on which there is a single FIGURE which is a schematic logic diagram of a circuit arrangement for achieving frame synchronization, according to the present invention, in a PCM receiver of a PCM T.D.M. telecommunications network.

DESCRIPTION OF THE PREFERRED EMBODIMENTS

The invention will be described below, first by reference to an exemplary embodiment of apparatus for carrying out the invention and then by way of a description of the mode of operation.

CIRCUIT ARRANGEMENT

A receiving counter EZ which is to be synchronized is illustrated on the drawing and, in the present case, comprises a three-stage bit counter BZ which counts up to 8, a channel counter KZ which is stepped on in dependence upon the carry signals of the bit counter EZ and which has five stages and thus counts up to 32, and a one-stage frame counter RZ which is stepped on in dependence upon the carry signal of the channel counter KZ and which counts up to 2. The receiving counter EZ forms a part of a PCM T.D.M. exchange which has not been illustrated in detail, and is stepped on with the bit pulse train which prevails on the assigned, incoming PCM line. Items of information occurring on the aforementioned incoming T.D.M. line are monitored for the occurrence of frame code words by means of a device which has also not been illustrated. A device of this kind can comprise a series-parallel converter and a multiple coincidence gate, whose inputs are connected to the parallel outputs of the converter, which inputs, in accordance with the bit combination which the frame code words are to possess, are blocking inputs and transmission inputs.

The frame synchronizing pulses RS derived from the occurrence of frame code words are fed to a store SCH1 which comprises $m-1$, and here with $m=4$, three series-connected shift registers SCHa, SCHb and SCHc, each comprising 256 shift register stages corresponding to the 256 bits within a pulse frame.

A further component of the circuit arrangement is formed by $m=4$ AND gates having $m=4$ inputs. In each of these AND gates, a different input is preceded by one of a plurality of inverters I1–I4. Corresponding inputs of the AND gates are connected to one another and to the input of the relevant, preceding inverter I. The inverter inputs are also connected to the output of a different shift register of the series-connected shift registers SCHa, SCHb and SCHc. In particular, the inverter I2 belonging to the AND gate U2 is connected to the output of the shift register SCHa, the inverter I3 belonging to the AND gate U3 is connected to the output of the shift register SCHb, and the inverter I4 belonging to the AND gate U4 is connected to the output of the shift register SCHc. An exception is formed by the inverter I1 which belongs to the AND gate U1 and whose input is connected to the input of the first shift register SCHa, which simultaneously forms the input of the circuit arrangement and receives the indication of the frame synchronizing pulses RS. The outputs of the AND gates U1–U4 are logically linked by an OR gate Od.

The circuit arrangement also comprises a collector loop which is composed of a pair of NAND gates N1 and N2 and a store SCH2, likewise in the form of a shift register. The shift register SCH2 has 256 shift register stages corresponding to the 256 bits within a pulse frame.

One input of the NAND gate N1 is connected to the output of an EXCLUSIVE-OR gate EO1. Its other input is connected to the output of the second NAND gate N2. The output of the NAND gate N1 is connected to the series input of the shift register SCH2. The series output of the shift register SCH2 is connected to the one input of the second NAND gate N2, and as set forth in more detail below, to the input of an inverter N3.

A further essentially component of the illustrated circuit arrangement comprises a control shift register StS which here has 4 stages. The step-on pulse train for this shift register is supplied by an EXCLUSIVE-OR gate EO2 which logically links the signals occurring at the output of the shift register SCH2, following inversion by the inverter N3, to signals RA which occur when the starting state of the receiving counter EZ is reached. The signals RA are also fed to the write-in input of the first stage of the control shift register StS.

The signals occurring at the parallel outputs of the two first stages of the control shift register StS are logically linked by a further NAND gate N4, whose output is connected to the second input, not previously mentioned, of the NAND gate N2.

The parallel outputs of the second, third and fourth stages of the control shift register StS are connected to a logic linking circuit which comprises an inverter N5 and a NAND gate N6. The parallel output of the third shift register is connected to the input of the inverter N5, and the parallel outputs of the second and fourth shift register stages are each connected to one of the three inputs of the NAND gate N6. The third input of the NAND gate N6 is connected to the output of the NAND gate N5.

The output signal from the NAND gate N6 is connected, on the one hand, to the resetting inputs of the receiving counter EZ and, on the other hand, to the resetting inputs of the control shift register StS.

MODE OF OPERATION

The mode of operation of the circuit arrangement described above will be explained in detail in the following. Here, it will be assumed that the asynchronous state prevails, in which case the control shift register StS has assumed the counter state 1111. It will also be assumed that genuine frame synchronizing signals RS must occur in each fourth pulse frame, although, as explained in the foregoing, present CCI recommendations provide an interval between the frame code words of m=2. It will be further assumed that an operating state currently prevails in which, over a period of several pulse frames, the frame code word is simulated by items of speech information and, accordingly, frame synchronizing signals RS which are here to be represented in the form of "0" signals, occur in corresponding time slots of adjacent pulse frames.

A "0" signal of this type in each case reaches one input of the AND gates U2–U4 in original form, for which reason the latter likewise emits a "0" signal. A "0" signal of this type, having been inverted by the inverter I1, reaches the one input of the AND gate U1 as a "1" signal. A "1" signal would be present at all of the three other inputs of the AND gate U1—by which means the logic linking condition would be fulfilled—only when a "1" signal occurs at the outputs of all of the three shift registers SCHa–SCHc. However, this can be the case only when, previously to the considered "0" signal at the input, no frame synchronizing signal, and thus a "1" signal, has been received in the corresponding time sections of the three preceding pulse frames.

When, however, a "0" signal occurs at the output of one of the shift registers SCHa–SCHc, the AND gate U1 also supplies a "0" signal as a result of which the OR gate Od also emits a "0" signal.

The aforementioned state in which "0" signals occur at the outputs of all three of the shift registers SCHa–SCHc, is set up, at the latest, after three pulse frames—under the imposed conditions, however, that for a whole series of pulse frames, frame synchronizing signals, and thus "0" signals, occur at the input. For such time as there is no interruption to the "0" signal sequence at the input, no potential change occurs in the previously described part of the circuit arrangement, so that "0" signals continue to be emitted by the OR gate Od.

The "0" output signal of the OR gate Od which is fed to the one input of the NAND gate N1 causes a "1" signal to be emitted by this logic element. This "1" signal, having been delayed by the shift register SCH2, arrives, one pulse frame later, following negation by the inverter N3, as a "0" signal at the one input of the EXCLUSIVE-OR gate EO2. If, at this time, the receiving counter EZ does not happen to occupy its receiving state, and accordingly a "0" signal is also present at the second input of the EXCLUSIVE-OR gate EO2, the logic linking condition is not fulfilled, as a result of which no timing pulse is supplied to the control shift register StS and therefore the contents thereof remains unaltered.

If the occurrence of a "1" signal in the collector loop coincides with the reaching of the starting counter state of the receiving counter EZ, and the signal RA is thus a "1" signal, a shift pulse train for the control shift register StS is in fact produced, but as a "1" signal is simultaneously entered into the first shift register stage, no change is made in the register contents 1111.

It will therefore be clear that frame synchronizing signals which occur in adjacent pulse frames, as intended, cannot affect the setting of the receiving counter EZ.

It will now be assumed that no frame synchronizing signal occurs in the time sections, corresponding to one another, of three preceding pulse frames, for which reason a "1" signal is received, and that in the following fourth pulse frame a frame synchronizing signal occurs in the form of a "0" signal. If one assumes an arbitrary constellation of the binary signals at the output of the shift registers SCHa–SCHc, for example a starting signal combination 101, then, as soon as the first and second considered "1" signals occur at the input of the circuit arrangement, the logic linking condition will be fulfilled, namely first of all in the case of the AND gate U3 and then in the case of the AND gate U4. The "1" signals emitted accordingly from the OR gate Od lead to the emission of a "0" signal by the NAND gate N1, and thus to an entry being made in the aforementioned collector loop. However, these are incorrect entries which are not the outcome of a correct frame code word. The manner in which these entries are rendered ineffective will be discussed in the following.

If, following an interval which lasts for three pulse frames and during which "1" signals have been received at the input of the circuit arrangement, a frame synchronizing signal now occurs in the form of a "0" signal, a "1" signal is present at the outputs of all three shift registers SCHa–SCHc. These signals are present at the second, third and fourth inputs of the AND gate U1, whose first input is likewise supplied with a "1" signal by way of the inverter I1, which results in the emission of a "1" signal which passes via the OR gate Od, to the NAND gate N1.

A "1" signal is likewise present at the other input of the NAND gate as an output signal of the NAND gate N2, as a "0" signal is present at its one input from the NAND gate N4, which is the result of the assumed content 11 of the two first stages of the control shift register StS. The NAND gate N1 therefore provides an entry into the collector loop in the form of a "0" signal. As already mentioned above, the collector loop can also contain entries which are derived from simulated frame code words, namely those which occur at an interval of more than four pulse frames.

In particular, it is possible for a plurality of such frame synchronizing signals to occur within a time interval of one pulse frame and, accordingly, for a plurality of entries to be made in the collector loop.

The aforementioned entries reappear in the form of "0" signals at the output of the shift register SCH2 of the collector loop, delayed by one pulse frame, and cause a "1" signal to be emitted by the NAND gate N2. If the frame synchronizing signal which produces the entry was a genuine frame synchronizing signal, in the corresponding time slots of the three following pulse frames, "1" signals must again occur at the input of the circuit arrangement. It will be seen that the OR gate Od in this case again emits a "1" signal on each occasion. In each corresponding time interval of the following pulse frames, a "0" signal is present only at one input of the shift registers SCHa–SCHc and at the input of the circuit arrangement, and is then inverted by one of the inverters I1–I4 so that at these times the logic linking condition is always fulfilled in one of the coincidence gates U1–U4.

This results in the fact that at these intervals of time a "1" signal is also present at the second input of the NAND gate N1, with the result that the entry into the collector loop in the form of a "0" signal is renewed.

If, on the other hand, the sequence of three "1" signals and one "0" signal, which occurs in the case of genuine frame synchronizing signals, at the input of the circuit arrangement is not repeated, having occurred once, then neither is a "1" signal emitted by the OR gate Od in each case one pulse frame following the entry into the collector loop. Therefore, the original entry is not renewed.

In this manner, the collector loop ensures that all entries based on non-genuine frame synchronizing signals repeatedly disappear.

The control shift register StS now, in the manner to be described in the following, recognizes that state of the collector loop in which there circulates only one entry which is based on a genuine frame code word.

The first "0" signal occurring at the output of the shift register SCH2 passes, as a "1" signal, to the one input of the EXCLUSIVE-OR gate EO2. Under the condition that the receiving counter EZ does not simultaneously assume its starting counter state, and therefore the signal RA is a "0" signal, the EXCLUSIVE-OR gate EO2 supplies a timing pulse T to the control shift register StS, with the result that the shift register contents is stepped on and, accordingly, the shift register state 0111 is established. Further entries into the collector loop produce a further shift and a corresponding modification of the shift register state. If, for example, there were three entries in the collector loop, on the expiration of a pulse frame the control shift register StS assumes the shift register state 0001. When the receiving counter EZ has reached its starting counter state and correspondingly a "1" signal reaches both the write-in input of the first shift register stage and the one input of the EXCLUSIVE-OR gate EO2, this means—provided this time does not exactly coincide with the occurrence of an entry at the output of the shift register SCH2, that a "1" signal is written into the first shift register stage, so that the shift register state 1000 is established. The following occurrence of a "0" signal at the output of the shift register SCH2, the shift register contents of the control shift register StS is stepped on in the described manner. It will be seen that due to the fact that the shift register contents of the shift register StS has already been stepped on several times in this stage the logical linking condition, which leads to the emission of a "1" signal, of the logic linking circuits composed of the elements N5 and N6 is not fulfilled. Therefore, the receiving counter EZ is not reset. If, on the other hand, the collector loop contains only one single entry in the form of a "0" signal, first of all the shift register state 101 is set up in the first three stages of the shift register, the "1" signals being produced by the signals RA, and the "0" signal being produced by the stepping on of a "1" signal of this type, which has been entered into the first shift register stage, due to this entry in the collector loop. With the next, repeated occurrence of the entry in the collector loop at the output of the shift register SCH2 in the form of a "0" signal, the shift register state is shifted by one position so that the shift register state 0101 is set. Now, the logical linking condition for the logic circuit comprising the elements N5 and N6 is fulfilled, with the result that now the receiving counter EZ is brought into its starting position and the entries in the control shift register StS are erased.

For such time as the frame synchronizing signals continue to occur at the expected times, and thus the entry in the collector loop is repeatedly renewed, there is no change in the state of the control shift register as now, even when the starting counter state of the receiving counter EZ is reached, the logic linking condition of the EXCLUSIVE-OR gate EO2 is not fulfilled and accordingly no timing pulse is produced.

Should the frame synchronizing signal RS fail to appear, then as described above, the entry in the collector loop is erased. Which results in the fact that now, whenever the receiving counter EZ has reached its starting counter state, a "1" signal is entered into the control shift register StS. If the two first stages contain a "1" signal of this type, the logic linking by the NAND gate N4 causes the NAND gate N2 to be supplied with a "0" signal as a result of which the collector loop, which has been interrupted as a result of the erasure of the single entry, is again prepared to receive an entry.

A new hunting process can now begin immediately, with the result that new entries are made in the collector loop.

If the signal RS which was originally assumed to be a genuine frame synchronizing signal reoccurs, such a reentry does not produce any changes as then the shift register state of the shift register StS, which corresponds to the fulfillment of the logic linking condition of the elements N5 and N6, is set simultaneously to the reaching of the starting counter state of the receiving counter EZ. If no new entries are made in the previous time position, the processes described above in association with resynchronization are repeated. The receiving counter EZ remains unchanged in its counter state relation until the time at which a new genuine frame synchronizing signal has been discovered. Therefore, here there is no necessity to ensure, by circuit measures, that the setting of the receiving counter is delayed, in the event of asynchronism, by a determinate length of time—in the concrete case of the CCI recommendations, by 6 pulse frames.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a process for achieving frame synchronization in a pulse code modulation receiver, including a receiving counter, of a pulse code modulation time division multiplex telecommunications network in response to receipt of frame synchronizing signals which occur in each m-th of the pulse frames on which the telecommunications system is based, of the type wherein a hunting process is carried out during a synchronizing time interval following the occurrence of frame synchronizing signals at intervals of m pulse frames and in response to such occurrence a receiving counter is synchronized, the improvement therein comprising the steps of:

storing the contents of the time sections in which the frame synchronizing signals can occur for a period of m−1 pulse frames, along with the time section contents of corresponding time sections of preceding and following pulse frames;

logically checking the stored contents m−1 times to determine if the frame synchronizing signals occur only once within m pulse frames in corresponding time sections;

upon a positive result of said checking, entering a result signal into a circulating memory and circulating the signal over an interval of one pulse frame and renewing the entry and circulation one pulse frame later in response to a corresponding positive result;

upon the absence of a positive result, erasing the result signal from the circulating memory;

resetting the receiving counter when, during an interval of one pulse frame, only one entry has been made in the circulating memory; and repeating the above steps after setting of the receiving counter beginning with the next first entry into the circulating memory.

2. Apparatus for achieving frame synchronization in a pulse code modulation receiver, including a receiving counter, of a pulse code modulation time division multiplex telecommunications network in response to receipt of frame synchronizing signals which occur in each m-th of the pulse frames on which the telecommunications system is based, of the type wherein a hunting process is carried out during a synchronizing time interval following the occurrence of frame synchronizing signals at intervals of m pulse frames and in response to such occurrence a receiving counter is synchronized, the improvement therein comprising:

means for storing the contents of the time sections in which the frame synchronizing signals can occur for a period of m−1 pulse frames, along with the time section contents of corresponding time sections of preceding and following pulse frames;

means for logically checking the stored contents m−1 times to determine if the frame synchronizing signals occur only once within m pulse frames in corresponding time sections; a circulating memory;

means for, upon a positive result of said checking, entering a result signal into a circulating memory and circulating the signal over an interval of one pulse frame later in response to a corresponding positive result;

means for, upon the absence of a positive result, erasing the result signal from the circulating memory; and means for resetting the receiving counter when, during an interval of one pulse frame, only one entry has been made in the circulating memory.

3. Apparatus for achieving frame synchronization in a pulse code modulation receiver, including a receiving counter, of a pulse code modulation time division multiplex telecommunications network in response to receipt of frame synchronizing signals which occur in each m-th of the pulse frames on which the telecommunications system is based, of the type wherein a hunting process is carried out during a synchronizing time interval following the occurrence of frame synchronizing signals at intervals of m pulse frames and in response to such occurrence a receiving counter is synchronized, the improvement therein comprising:

a plurality of serially-connected shift registers, m−1 in number, for storing the time section contents;

each of said shift registers including a number of stages equal to the number of bits in each pulse frame;

a plurality of AND gates, m in number, each having m inputs;

a plurality of inverters, each of said AND gates including a different input connected to the output of a respective inverter, each of said inverters including an input connected to a respective output of said shift registers, with the exception of one inverter which is connected to the input of the first shift register of said serially-connected shift registers which constitutes an input for receiving frame synchronization signals;

an OR gate connected to the outputs of said AND gates and responsive thereto to provide a result signal;

a circulating memory connected to said OR gate, including a shift register having a number of stages equal to the number of bits of a pulse frame, said circulating memory comprising another shift register having a number of stages equal to the number of bits in a pulse frame, two NAND gates each including two inputs, one of said NAND gates connected to the output of said OR gate, its output connected to the input of said other shift register, its other input connected to the output of the other of said NAND gates, one of said inputs of said other NAND gate connected to the output of said other shift register, the other input of said other AND gate connected to receive a release signal for said circulating memory in response to first-time entries;

a control shift register including an input for receiving a pulse train;

an EXCLUSIVE-OR gate having an output connected to said input of said control shift register, a first input connected to the output of said other shift register;

an input of said control counter connected to receive start signals when the start position of the receiving counter is reached;

said control counter including a series input for receiving start signals; and a logic circuit connected to said control shift register to reset said receiving counter and said control shift register in response to a control shift register state which signifies that only one entry is circulating within the circulating memory and that said entry has again produced a timing pulse.

* * * * *